US006189988B1

United States Patent
Nicolai et al.

(12) United States Patent
(10) Patent No.: US 6,189,988 B1
(45) Date of Patent: Feb. 20, 2001

(54) SWITCHING CABINET

(75) Inventors: Walter Nicolai, Buseck; Udo Münch, Sinn; Georg Vogel, Schwieberdingen, all of (DE)

(73) Assignee: Rittal-Werk Rudolf Loh GmbH & Co., KG, Herborn (DE)

( * ) Notice: Under 35 U.S.C. 154(b), the term of this patent shall be extended for 0 days.

(21) Appl. No.: 09/292,897

(22) Filed: Apr. 16, 1999

(30) Foreign Application Priority Data

Apr. 17, 1998 (DE) ................................................ 198 16 945

(51) Int. Cl.$^7$ ..................................................... A47G 29/00
(52) U.S. Cl. ..................... 312/265.3; 312/265.6; 312/265.5
(58) Field of Search ................................. 312/257.1, 263, 312/265.1, 265.2, 265.3, 265.4, 265.5, 265.6

(56) References Cited

U.S. PATENT DOCUMENTS

| | | | | |
|---|---|---|---|---|
| 949,204 | * | 2/1910 | Stiehl ............................ | 312/265.5 X |
| 1,374,868 | * | 4/1921 | White et al. ...................... | 312/265.2 |
| 2,522,097 | * | 9/1950 | Cookson ......................... | 312/263 X |
| 2,869,953 | * | 1/1959 | Miller et al. .................... | 312/265.5 X |
| 3,297,384 | * | 1/1967 | Buice .................................. | 312/263 |
| 4,265,500 | * | 5/1981 | Berton et al. .................. | 312/265.6 X |
| 5,202,818 | * | 4/1993 | Betsch et al. ................... | 312/257.1 X |
| 5,333,950 | * | 8/1994 | Zachrai ........................... | 312/265.4 X |
| 5,971,511 | * | 10/1999 | Diebel et al. ...................... | 312/265.3 |

FOREIGN PATENT DOCUMENTS

3731547 * 3/1989 (DE) .

* cited by examiner

Primary Examiner—Peter M. Cuomo
Assistant Examiner—Hanh V. Tran
(74) Attorney, Agent, or Firm—Pauley Petersen Kinne & Fejer

(57) ABSTRACT

A switching cabinet with two side walls, a back wall, a bottom side and a cover side and with frame pieces which, at least in part, are formed by multiple beveling of the side walls, the back wall, the bottom side or the cover side in the inner space of the switching cabinet, where the sections formed by beveling have a section which is inclined or parallel to the plane of the corresponding side wall, the back wall, the bottom side or the cover side and is at a distance from these. Extended mounting capabilities are offered by the fact that the inclined or parallel sections of two bordering walls standing perpendicular to one another or of a wall and a side of the switching cabinet are assigned to one another in such a way that they form a deepened inside receptacle in the inside space of the switching cabinet.

13 Claims, 3 Drawing Sheets

SWITCHING CABINET

BACKGROUND OF THE INVENTION

1. Field of the Invention

This invention relates to with a switching cabinet with wall elements having side walls, a back wall, a bottom and a cover side and with frame pieces which are formed at least in part by multiple beveling of the wall elements in the inside space of the switching cabinet, so that the sections formed by beveling have a section running inclined or parallel at a distance from the corresponding wall element.

2. Description of Prior Art

A switching cabinet of this type is known from German Patent Reference DE 37 31 547 C3. In this switching cabinet of the art, by multiple beveling, frame sections are formed on the side walls, back wall, bottom side and/or cover; these have two sections which are perpendicular to one another, directed toward the inside space of the body of the cabinet and thus provide possibilities of adding to the depth, width and height of the body of the cabinet. In addition, by the beveling on the open sides of the body of the cabinet, standing-away sealing struts are formed which facilitate and improve connection between the body of the cabinet and the back wall or the doors of the cabinet. Frequently, additional mounting is desirable in the inside space of the switching cabinet.

SUMMARY OF THE INVENTION

One object of this invention is to provide a switching cabinet of the type described at the outset, which provides additional mounting capabilities with as simple construction as possible.

This object is achieved with the characteristics described in the claims. Inclined or parallel sections of two wall elements that are perpendicular to one another and border one another or of a wall element and another part of the frame of the switching cabinet are arranged in such a way with respect to one another that they form a deepened inside receptacle in the inside space of the switching cabinet.

The deepened inside receptacle in the frame pieces in the inside space of the switching cabinet provides the capability to utilize the deepening itself in addition to the other sections of the frame piece present in the inside space of the switching cabinet for the introduction and laying of mounting elements, for example, cables, cable guides and other components. For example, sections parallel to the corresponding side wall provide the possibility of an additional mounting plane in addition to another section on the frame piece also directed parallel to this side wall but perpendicularly to the back wall adjoining it at a right angle.

A suitable additional mounting section, which is directed parallel to the parallel section, but is displaced with respect to it, is obtained in a simple way by connecting the inclined or parallel section with a section perpendicular to the corresponding side wall, back wall, bottom or cover side. In this way, the inside receptacle is also easily accessible.

The advantageous frame piece can be formed with only a few bevels, in such a way that the side wall, the back wall, the bottom side or the cover side of the corresponding edge of the switching cabinet is beveled first toward an intermediate section to the inside space of the switching cabinet and the inclined or parallel section is connected to the intermediate section and continues into the perpendicular section. For example, in this case, the intermediate section is bent at 135° so that it runs in the direction of the angle bisector of the corresponding switching cabinet edge. The parallel section is then formed from the intermediate section by further bending by 45° while the perpendicular section is connected to the parallel section by bending again at 90°. The connection of the parallel section to the intermediate section and of the perpendicular section to the parallel section can, however, also be achieved through other suitable transition sections.

In another embodiment for beveling the frame piece the side wall, back wall, bottom side or the cover side of the corresponding edge of the switching cabinet is first bent by 180° toward the inside as an additional piece on the inside of the side wall, back wall, bottom side or cover side and the connecting piece continues into the perpendicular section to which the inclined or parallel section is connected. With angling at 180° and the resulting double layer, the frame piece becomes strengthened and, moreover, it becomes possible to provide, through the parallel section, a connection to the parallel section of the bevelings of the neighboring other wall. In this case, for example, the inclined or parallel section continues in an intermediate section directed to the corresponding edge of the switching cabinet, so that the intermediate sections of the bevelings of the two neighboring walls are contacted with one another and can be sealed. Furthermore, there is the possibility of a continuous transition into the neighboring wall element with the measures that the two oppositely directed parallel sections forming an inner receptacle continue into one another by further beveling to form one piece. Without separate frame piece, in this way a single-piece, stable structure is achieved, for example, the side walls in combination with the back wall, creating multiple possibilities for mounting in the inner space.

The transition between the inclined or parallel sections in the region of the inner receptacle is advantageously designed in such a way that the two inclined or parallel sections forming an inner receptacle border each other with their oppositely directed regions or through a section which runs perpendicularly to the angle bisector of the corresponding switching cabinet edge or through a swallow-tail-shaped section.

Advantageously for the mounting possibilities, the inclined or parallel sections forming the inner receptacle on the one hand and the perpendicular sections on the other hand, have at least in sections rows of holes of the same or different grid.

With a design where mounting tracks are adapted to the cross-section of the inner receptacle, as seen in FIG. 4, which extend, in the state used, at least in sections along the length of the internal receptacles and where the mounting tracks have other fastening seats at least on their outsides directed into the inside space of the switching cabinet, there are additional capabilities for mounting, where the mounting tracks can have different grids of holes. At the same time, using the mounting tracks, a connection can be produced of the neighboring wall elements of the switching cabinet in the region of the frame piece.

If the mounting tracks have two outsides directed perpendicularly to one another, which, in the state used, are flush with the perpendicular sections of the corresponding frame piece, then an enlarged mounting surface is created in the inner space. For the assembly of the switching cabinet, the measures that vertically running frame pieces are bent down on the side walls and on the back wall and the bottom side and the cover side have vertically directed pegs, with which the frame pieces are connected. The side walls and the back wall can be connected simply with these means to the bottom side and the cover side by insertion and then can be secured. In different embodiments, one peg is secured in the inner receptacle as a result of which the wall elements can be removed simply individually subsequently and can be set in again, or two pegs are provided per frame piece, which penetrate into the hollow space or into the two hollow spaces of the frame piece, which makes simple assembly possible.

BRIEF DESCRIPTION OF THE DRAWINGS

This invention will be explained in more detail below with the aid of practical examples, with reference to the drawings, wherein.

DESCRIPTION OF PREFERRED EMBODIMENTS

Figure 1:
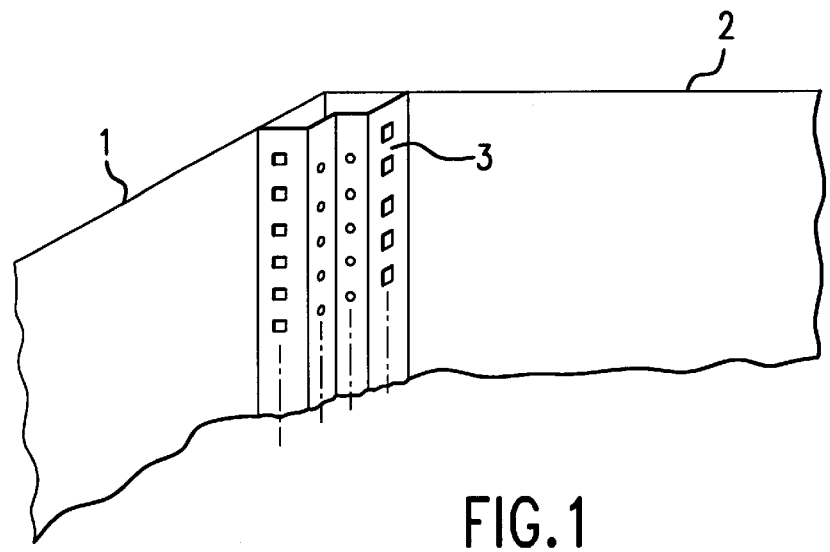
FIG. 1 is a sectional perspective schematic view of two neighboring wall elements of a switching cabinet with a vertical frame piece formed at the edge.

FIG. 1 shows an edge region of a switching cabinet in which side wall 1 and back wall 2 abut at frame piece 3. Frame piece 3 is formed by multiple beveling of side wall 1 and back wall 2 and has a section 3.5 which is parallel to the side wall or to the back wall as well as a section 3.1 which is perpendicular to side wall 1 or back wall 2 and has rows of holes for mounting internal structures of the switching cabinet. An inner receptacle 3.2, which has a rectangular cross-section, is formed between the two parallel sections 3.5.

Figure 2:
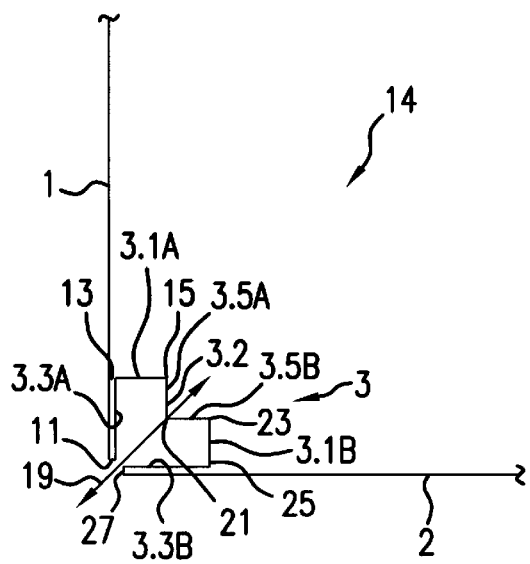
FIG. 2 is a schematic view of a practical example for a beveled frame piece in the edge region of a side wall and a back wall with a one-piece transition.

A frame piece 3, as formed by multiple beveling, or bending, of the side wall 1 and the back wall 2, can be produced in different ways as shown in FIGS. 2–5. As seen in FIG. 2, a continuous frame piece 3 is formed between the side wall 1 and back wall 2. The frame piece 3 is bent to have numerous receptacle-forming sections interior of the side wall 1 and back wall 2. In the following description of FIG. 2 "perpendicular" and "parallel" designate positions with respect to the side wall 1 unless otherwise noted. It will be appreciated for future reference that those sections of the frame piece 3 which are perpendicular to the side wall 1 are parallel to the back wall 2 and vice versa. Side wall 1 continues into a connecting piece 3.3A positioned inside of, adjacent, and parallel to, the side wall 1 by a first bend 11 at 180°. Connecting piece 3.3A is then bent 90° at a second bend 13 to continue as a first perpendicular section 3.1A towards the interior 14 of the cabinet in perpendicular relation to the side wall 1. Section 3.1A is then bent 90° at a third bend 15 to continue as a first parallel section 3.5A spaced from and running parallel to the side wall 1 and perpendicular to the back wall 2. At the end of section 3.5A is an imaginary line, indicated at ref no. 19, referred to as the "angle bisector" which bisects the 90° corner of the cabinet and therefore necessarily bisects and thereby defines the two halves of the frame piece 3 in terms of belonging to the side wall 1 or back wall 2, for purposes of the present discussion.

Section 3.5A is then bent at 90° in a fourth bend 21 and passes over the angle bisector 19 to form a second perpendicular section 3.5B, arbitrarily designated as being a part of back wall 2, and running parallel to the back wall 2. Section 3.5B is then bent at a fifth bend 23, arbitrarily designated as being a bend of back wall 2, at 90° towards the back wall 2 and forming a second parallel section 3.1 B, which is perpendicular in relation to the back wall 2. Section 3.1B is then bent towards the corner, or side wall 1, at a sixth bend 25 of the back wall, at 90°, to form a connecting piece section 3.3B which is parallel to and adjacent the back wall 2. Connecting piece section 3.3B is then bent at a seventh bend 27 of 180° to continue into the back wall 2.

Figure 3:
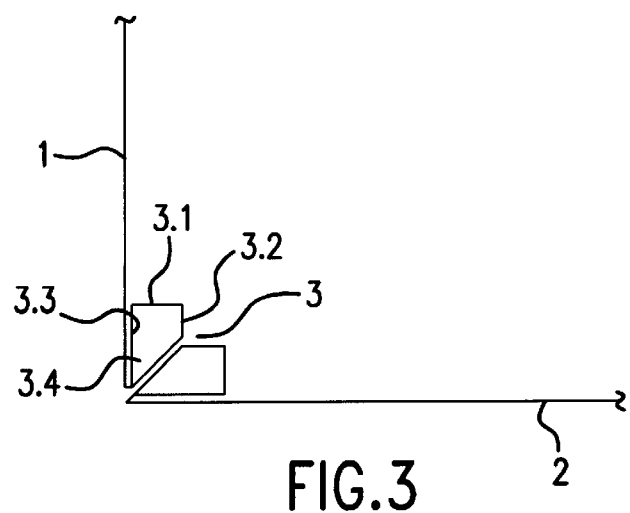
FIG. 3 is schematic view of another embodiment for a frame piece beveled in the edge region of a side wall and a back wall with a one-piece transition.

In contrast to the practical example according to FIG. 2, in the practical example shown in FIG. 3, internal section 3.4', directed to the edge of the cabinet, is beveled at the inner edge of the inner receptacle 3.2 and this is formed as a double layer and in one piece by rebeveling in the region of the cabinet edge by 180°.

Figure 4:
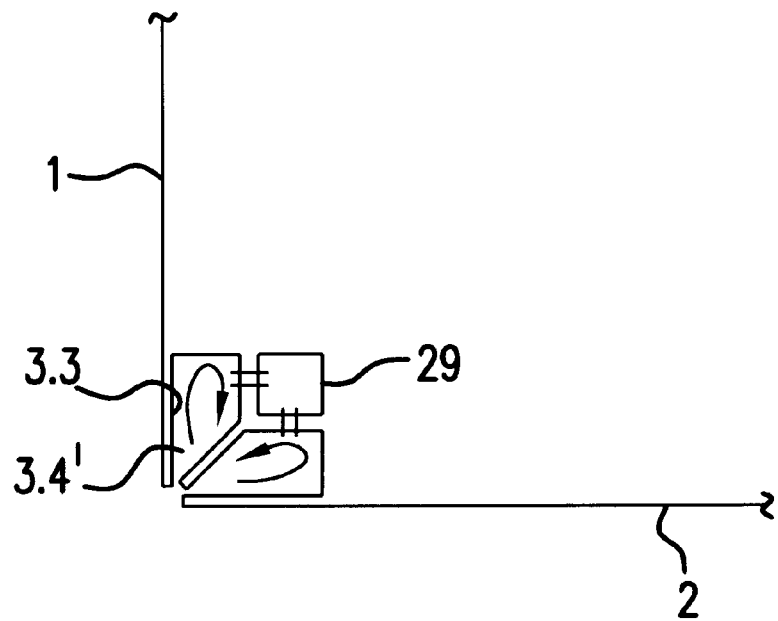
FIG. 4 is a schematic view of a practical example of a frame piece beveled in the edge region of a side wall and a back wall with a separated side wall and back wall with a mounting rail shown flush-mounted with the frame piece.
Figure 5:
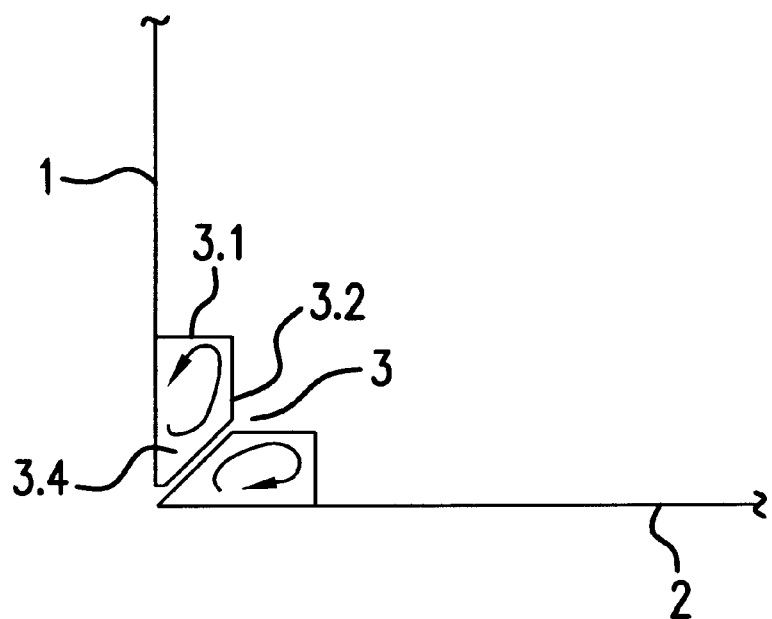
FIG. 5 is a schematic view of another practical example of a beveled frame piece with a separated side wall and back wall.

While the practical examples according to FIGS. 2 and 3 show a single-piece transition through the frame piece 3 between side wall 1 and back wall 2, in the practical examples according to FIGS. 4 and 5, side wall 1 and back wall 2 are separated from one another in the region of the frame piece 3 and are joined by inserting a sealing element which is not shown in the drawings.

FIG. 4 shows a beveling of side wall 1 and of back wall 2 corresponding to that of FIG. 3, where the double-layer intermediate section 3.4' is, however, separated in the edge region. As in the case of the practical example according to FIG. 3, the intermediate section 3.4' proceeds in the direction of the angle bisector of the corresponding cabinet edge.

In the practical example according to FIG. 5, side wall 1 as well as back wall 2 are beveled toward the inside by 135° toward the inside in the region of the cabinet edge, in order to form the double-layer intermediate section 3.4, and through another beveling by another 45°, continues into the particular parallel section 3.5, which together form the right-angled inner receptacle 3.2. The two parallel sections 3.5 are again bent at a right angle toward the outside and proceed into the particular perpendicular sections 3.1, which border on the inside of side wall 1 or back wall 2. The sealing can be done in this practical example, too, in the region of intermediate section 3.4.

The frame pieces 3 which are produced in the described manner by multiple beveling provide two mounting planes at different distances to side wall 1 or back wall 2 by combination of parallel section 3.5 of side wall 1 with vertical section 3.1 of back wall 2 on the one hand and parallel section 3.5 of back wall 2 with perpendicular section 3.1 of side wall 1 on the other hand. By suitable selection of the grid of holes in parallel sections 3.5, and perpendicular sections 3.1, a great variety of mounting possibilities arise for internal structures, for example, for equipment or holders and, for example, in the inner receptacle 3.2 cable can be guided unhindered and easily accessible.

In the case of separated side wall 1 and back wall 2, using suitable struts or beads and attached or inserted sealing elements, sealing against moisture and electromagnetic influences can be provided. For example, a connection in the region of the layers of intermediate section 3.4 that lie against one another can be accomplished using screws or clamps or with angles in inner receptacle 3.2. For mounting, in inner receptacles 3.2, at least in sections over the length of the frame piece 3, mounting tracks 29 (FIG. 4) can be inserted which are complementing and are adapted to inner receptacle 3.2, the mounting tracks also having suitable fastening seats for internal structures. Flushing the outsides with perpendicular sections 3.1 of frame piece 3 provides a widened mounting surface.

Figure 6:
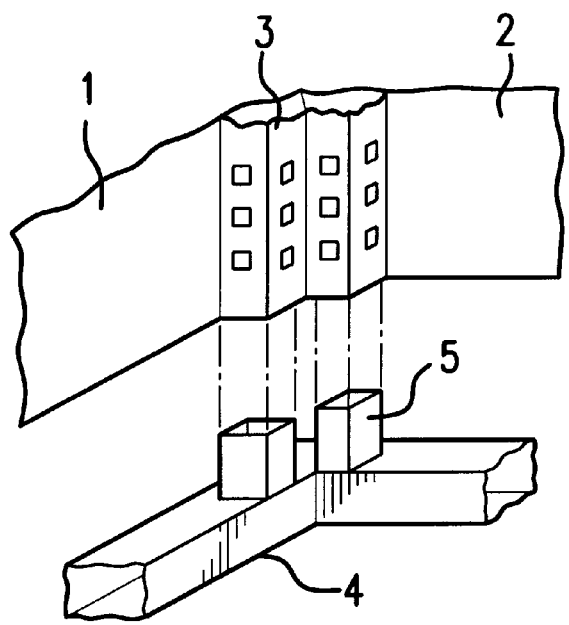
FIG. 6 is a perspective schematic view of an edge with a side wall and a back wall and of a bottom side with two pegs of a frame piece to be inserted.
Figure 7:
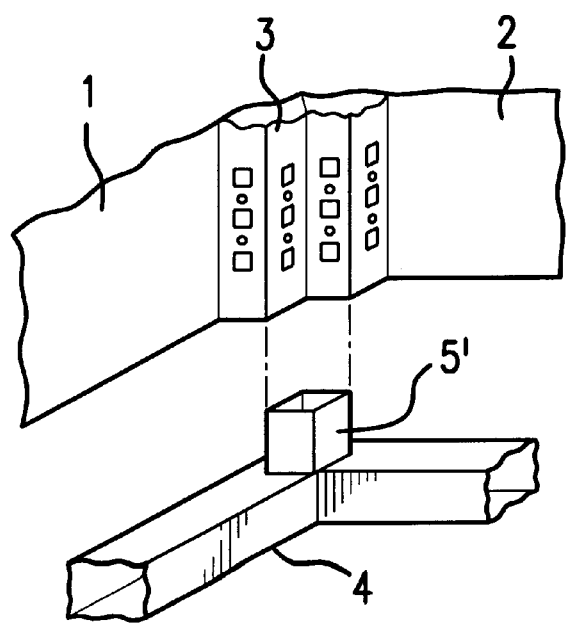
FIG. 7 is a perspective schematic view of another practical embodiment for the connection between a frame piece and a peg on the bottom side.

FIGS. 6 and 7 show examples as to how side wall 1 and back wall 2 can be assembled with a floor frame. FIG. 6 shows bottom frame 4 with two pegs 5 directed perpendicularly upward, which are introduced into the two chambers or hollow spaces formed in frame piece 3. Corresponding pegs can also exist on the cover side, not shown in the drawings, so that the side walls 1 and back wall 2 are already held by simply pushing these together. Then side walls 1 and back wall 2 can be secured on bottom frame 4 and the cover side.

In the example according to FIG. 7, bottom frame 4 has only one peg 5' in the corners, which is secured in inner space 3.2 of frame piece 3.

The production of frame piece 3 can also be done by beveling the cover side and/or bottom side in the region of back wall 2 and/or side walls 1.

Although the described rectangular bevelings for producing the parallel sections 3.5 and the vertical sections 3.1 have advantages, with suitable adapters and adapted parts of the internal structures and mounting parts, one can also bevel sections of frame piece 3 which run at an angle to side walls 1 or back wall 2. Especially, in the region of the inner edge of inner receptacle 3.2, this can be formed differently, for example, it can have a swallow-tail shape or can run perpendicularly to the angle bisector of the edge of the cabinet.

We claim:

1. In a switching cabinet having abutting first and second wall elements including a side wall (1), a back wall (2), a bottom side, and a cover side; and frame pieces (3) which are formed at least in part by multiple bending of the abutting wall elements into sections comprising said frame pieces, the improvement comprising:

each one of the two abutting wall elements being bent to produce first and second receptacle sections which are perpendicular to one another;

the first receptacle section being perpendicular to its associated wall element, the second receptacle section being parallel to its associated wall element;

the receptacle sections being arranged such that when the frame piece is constructed, the two abutting wall elements have receptacle sections combined to form an inner receptacle (3.2) closed from the inner space of the switching cabinet, and having two sets of parallel walls facing the interior of the cabinet, with the first set of parallel walls composed of the first receptacle section of the first abutting wall and the second receptacle section of the second abutting wall; and the second set of parallel walls composed of the second receptacle section of the first abutting wall and the first receptacle section of the second abutting wall wherein the receptacle sections of each abutting wall element are constructed to form adjacent halves of said frame piece, with the halves together bordering on a plane bisecting the corner angle of the switching cabinet.

2. In the switching cabinet according to claim 1, wherein the wall element is bent first with an intermediate section (3.4) directed toward the inner space of the switching cabinet and the first parallel section (3.5A) extends from the intermediate section (3.4) and is bent to form the first perpendicular section (3.1A).

3. In the switching cabinet according to claim 1, wherein the wall element, starting from the corresponding edge of the switching cabinet, is first bent by 180° to form a connecting piece (3.3A) positioned adjacent an inside surface of the wall element, and the connecting piece (3.3A) continues in the first perpendicular section (3.1A) to which the first parallel section (3.5A) is connected.

4. In the switching cabinet according to claim 3, wherein the first parallel section (3.5A) continues as an intermediate section (3.4') directed to the 180 degree first bend (11).

5. In the switching cabinet according to claim 1, wherein each of the parallel sections being contiguous and forming the inner receptacle (3.2), and bent with respect to each other.

6. In the switching cabinet according to claim 5, wherein at least some of the sections which form the inner receptacle (3.2) have a plurality of rows of holes forming a grid.

7. The switching cabinet according to claim 6, further comprising a plurality of mounting tracks adapted to abut internal receptacles (3.2) and extend at least in sections over a length of the inner receptacles (3.2) and wherein the mounting tracks have additional fastening holes directed toward the inner space of the switching cabinet.

8. In the switching cabinet according to claim 7, wherein the mounting tracks have two outside surfaces directed perpendicularly to one another and which in an inserted state are flush with the perpendicular sections (3.1) of the corresponding frame piece (3).

9. In the switching cabinet according to claim 8, wherein a frame piece of said frame pieces (3) running vertically on the side wall (1) and a frame piece (3) of said frame pieces running vertically on the back wall (2) are mated with a bottom side which has a vertically directed peg (5.5') with which at least one of the frame pieces (3) are connected.

10. In the switching cabinet according to claim 9, wherein at least one of the vertically directed pegs (5,5') is adapted to penetrate into a hollow space of the vertical frame pieces.

11. In the switching cabinet according to claim 1, wherein at least some of the sections (3.5) which form the inner receptacle (3.2) have a plurality of rows of holes forming a grid.

12. In the switching cabinet according to claim 1, wherein a frame piece (3) of said frame pieces running vertically on the side wall (1) and a frame piece (3) of said frame pieces running vertically on the back wall (2) are mated with the bottom side which has at least one vertically directed peg with which the vertical frame pieces (3) are connected.

13. In a switching cabinet according to claim 1, wherein all bending is interior of the outer surface of the wall from which the sections are formed.

* * * * *